US012652179B2

(12) United States Patent
Haslinger et al.

(10) Patent No.: US 12,652,179 B2
(45) Date of Patent: Jun. 9, 2026

(54) BATTERY SYSTEM AND METHOD OF CONFIGURING THE SAME

(71) Applicant: NXP B.V., Eindhoven (NL)

(72) Inventors: Dorian Haslinger, Nestelbach bei Graz (AT); Naman Khullar, Graz (AT); Marc Manninger, Graz (AT)

(73) Assignee: NXP B.V., Eindhoven (NL)

( * ) Notice: Subject to any disclaimer, the term of this patent is extended or adjusted under 35 U.S.C. 154(b) by 98 days.

(21) Appl. No.: 18/405,083

(22) Filed: Jan. 5, 2024

(65) Prior Publication Data

US 2024/0243927 A1     Jul. 18, 2024

(30) Foreign Application Priority Data

Jan. 18, 2023    (EP) ..................................... 23152299

(51) Int. Cl.
*H04L 29/00*        (2006.01)
*B60L 58/18*        (2019.01)
*H04L 9/32*         (2006.01)

(52) U.S. Cl.
CPC ............ *H04L 9/3268* (2013.01); *B60L 58/18* (2019.02); *B60L 2270/00* (2013.01)

(58) Field of Classification Search
CPC .... H04L 9/3268; B60L 58/18; B60L 2270/00; B60L 2270/40; B60L 58/10; H01M 2010/4271; H01M 2220/20; H01M 10/425; H01M 10/4257; H01M 2010/4278; Y02E 60/10
See application file for complete search history.

(56) References Cited

U.S. PATENT DOCUMENTS

| | | | | |
|---|---|---|---|---|
| 10,608,291 B2 * | 3/2020 | Junger | ................. | H01M 10/46 |
| 2012/0050054 A1 | 3/2012 | Fujiwara | | |
| 2021/0306033 A1 * | 9/2021 | Eber | ....................... | H04W 4/80 |
| 2021/0341983 A1 | 11/2021 | Tan et al. | | |
| 2022/0113356 A1 | 4/2022 | Kasselman et al. | | |
| 2022/0157106 A1 * | 5/2022 | Pirch | ........................ | G07C 9/28 |
| 2022/0305945 A1 * | 9/2022 | Dooley | ................. | H04L 63/08 |
| 2022/0305950 A1 * | 9/2022 | Zhu | ........................... | G06N 3/06 |
| 2023/0081292 A1 * | 3/2023 | Schneider | ............... | B60L 58/26 |
| | | | | 180/68.5 |

FOREIGN PATENT DOCUMENTS

| | | | | |
|---|---|---|---|---|
| CN | 106300510 A | 1/2017 | | |
| CN | 106253417 B | 1/2019 | | |
| CN | 210272588 U | 4/2020 | | |
| CN | 114079091 A | 2/2022 | | |
| DE | 102013209443.4 A1 | 11/2014 | | |
| EP | 2960119 A1 * | 12/2015 | .......... | H04L 9/3226 |
| EP | 2908193 B1 * | 2/2023 | ......... | H01M 50/576 |

* cited by examiner

*Primary Examiner* — Ghazal B Shehni

(57) ABSTRACT

In accordance with a first aspect of the present disclosure, a battery system is provided for use in a vehicle, comprising: a plurality of battery modules; a controller operatively coupled to the battery modules; a plurality of secure elements, wherein each of said battery modules contains at least one of said secure elements and wherein the controller contains at least one of said secure elements, and wherein said secure elements are configured to perform one or more authentication operations by executing a cryptographic algorithm. In accordance with a second aspect of the present disclosure, a corresponding method of configuring a battery system is conceived.

20 Claims, 5 Drawing Sheets

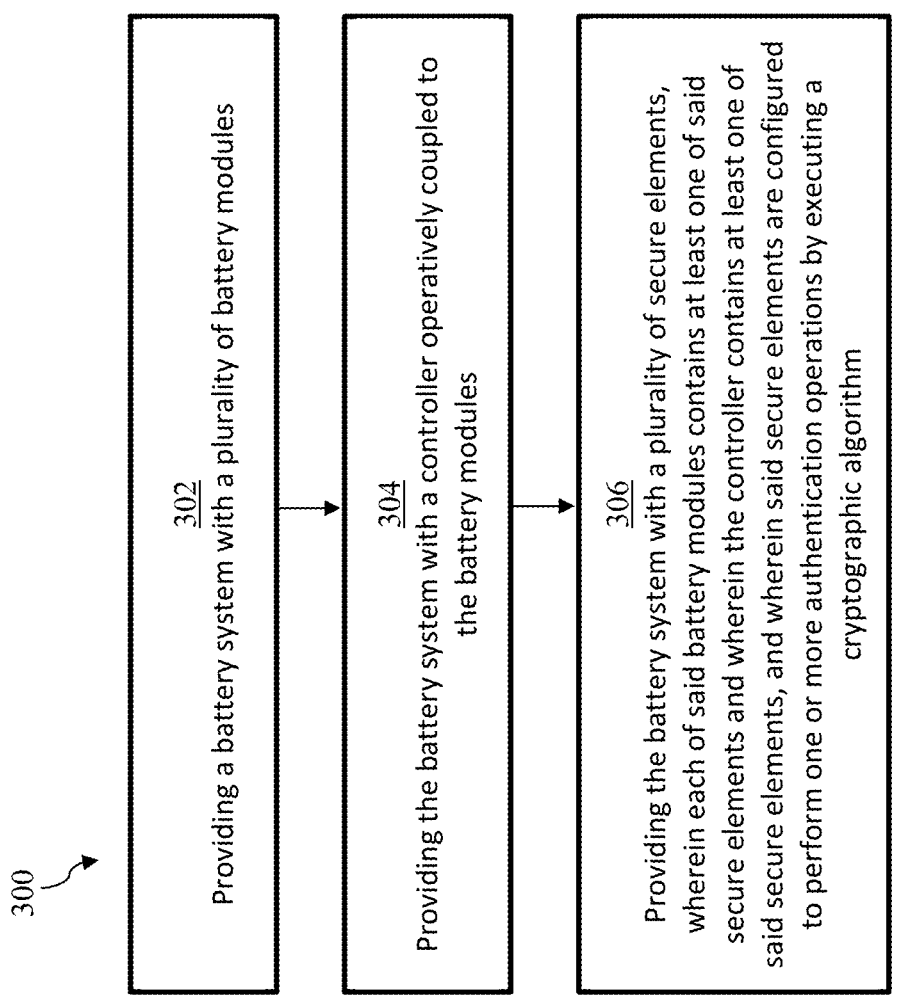

302
Providing a battery system with a plurality of battery modules

304
Providing the battery system with a controller operatively coupled to the battery modules 306
Providing the battery system with a plurality of secure elements, wherein each of said battery modules contains at least one of said secure elements and wherein the controller contains at least one of said secure elements, and wherein said secure elements are configured to perform one or more authentication operations by executing a cryptographic algorithm

BATTERY SYSTEM AND METHOD OF CONFIGURING THE SAME

CROSS-REFERENCE TO RELATED APPLICATIONS

This application claims priority under 35 U.S.C. § 119 to European patent application no. 23152299.6, filed Jan. 18, 2023 the contents of which are incorporated by reference herein.

TECHNICAL FIELD

The present disclosure relates to a battery system for use in a vehicle. Furthermore, the present disclosure relates to a corresponding method of configuring a battery system for use in a vehicle.

BACKGROUND

Electric vehicles typically contain battery packs containing multiple battery modules or battery cells. It may be necessary to prove the authenticity and verify the integrity of these battery modules, for example when they are installed or replaced in a battery pack. However, proving the authenticity and verifying the integrity of battery modules typically requires additional hardware and software. Furthermore, it may be difficult to implement this functionality. In addition, this functionality may introduce latency in the communication between the modules and a central controller within the vehicle. Therefore, there may be a need to facilitate proving the authenticity and verifying the integrity of battery modules within battery packs.

SUMMARY

In accordance with a first aspect of the present disclosure, a battery system is provided for use in a vehicle, comprising: a plurality of battery modules; a controller operatively coupled to the battery modules; a plurality of secure elements, wherein each of said battery modules contains at least one of said secure elements and wherein the controller contains at least one of said secure elements, and wherein said secure elements are configured to perform one or more authentication operations by executing a cryptographic algorithm.

In one or more embodiments, the controller is an electronic control unit (ECU) comprised in the vehicle, in particular a body control module (BCM) or a telematics control unit (TCU).

In one or more embodiments, the battery modules are placed in a series arrangement, wherein the first battery module in the series arrangement is configured to perform at least one authentication operation with the controller, and wherein each of the other battery modules in the series arrangement is configured to perform at least one authentication operation with a prior battery module in the series arrangement.

In one or more embodiments, the secure elements contained in the battery modules further contain data indicative of a charge state and/or a life state of said battery modules.

In one or more embodiments, the at least one secure element contained in the controller is configured to maintain a registry of the charge state and/or life state of the battery modules.

In one or more embodiments, the cryptographic algorithm is an asymmetric cryptographic algorithm or a symmetric cryptographic algorithm.

In one or more embodiments, the secure elements contained in the battery modules have been provisioned with cryptographic keys and/or cryptographic certificates in a trusted environment.

In one or more embodiments, the at least one secure element contained in the controller has been provisioned with cryptographic keys and/or cryptographic certificates in a trusted environment and by an over-the-air transmission.

In one or more embodiments, the battery system further comprises a battery management system (BMS) coupled between the controller and the plurality of battery modules.

In one or more embodiments, the authentication operations form part of a pairing process.

In accordance with a second aspect of the present disclosure, a method of configuring a battery system is conceived for use in a vehicle, comprising: providing the battery system with a plurality of battery modules; providing the battery system with a controller operatively coupled to the battery modules; providing the battery system with a plurality of secure elements, wherein each of said battery modules contains at least one of said secure elements and wherein the controller contains at least one of said secure elements, and wherein said secure elements are configured to perform one or more authentication operations by executing a cryptographic algorithm.

In one or more embodiments, the controller is an electronic control unit (ECU) comprised in the vehicle, in particular a body control module (BCM) or a telematics control unit (TCU).

In one or more embodiments, the battery modules are placed in a series arrangement, wherein the first battery module in the series arrangement is configured to perform at least one authentication operation with the controller, and wherein each of the other battery modules in the series arrangement is configured to perform at least one authentication operation with a prior battery module in the series arrangement.

In one or more embodiments, the secure elements contained in the battery modules further contain data indicative of a charge state and/or a life state of said battery modules.

In one or more embodiments, the at least one secure element contained in the controller is configured to maintain a registry of the charge state and/or life state of the battery modules.

DESCRIPTION OF DRAWINGS

Embodiments will be described in more detail with reference to the appended drawings.

FIG. 3 shows an illustrative embodiment of a method of configuring a battery system.

DESCRIPTION OF EMBODIMENTS

Figure 1:
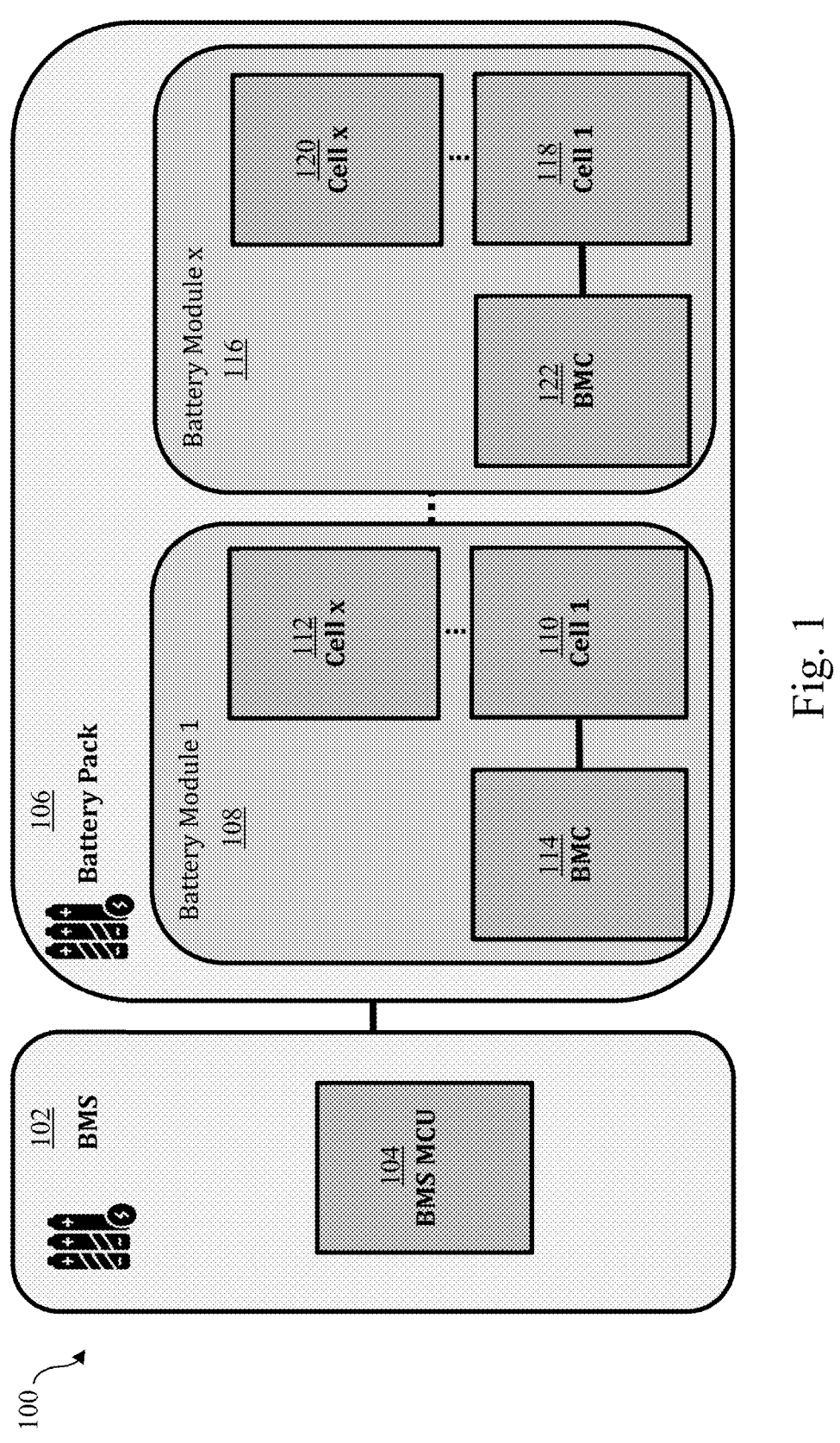
FIG. 1 shows an example of a battery system.

FIG. 1 shows an example of a battery system 100, in particular for use in a vehicle. The battery system 100 comprises a battery management system (BMS), which in turn contains a BMS microcontroller 104. Furthermore, the battery system 100 comprises a battery pack 106, which in turn includes a plurality of battery modules 108, 116. Each battery module 108, 116 comprises one or more battery cells 110, 112, 118, 120, which may be controlled by a battery module controller 114, 122. As mentioned above, it may be necessary to prove the authenticity and verify the integrity of the battery modules 108, 116, for example when they are installed or replaced in the battery pack 106. Since this functionality may be costly, difficult to implement and result in a performance reduction, there may be a need to facilitate it.

More specifically, various BMS architectures are available on the market, which may require a flexible security concept. It is noted that battery modules should be exchangeable due to damage or end-of-life. In case new battery modules are inserted into a battery pack, it should be possible to pair these modules to a vehicle. Such a pairing process typically involves the execution of authentication operations. This may require a flexible trust provisioning service, which allows to preconfigure the devices in a secure environment. Furthermore, the latency caused by the authentication operations should be kept to a minimum, to guarantee a satisfactory user experience.

Now discussed are a battery system for use in a vehicle, and a corresponding method of configuring a battery system for use in a vehicle, which facilitate proving the authenticity and verifying the integrity of battery modules within battery packs.

Figure 2:
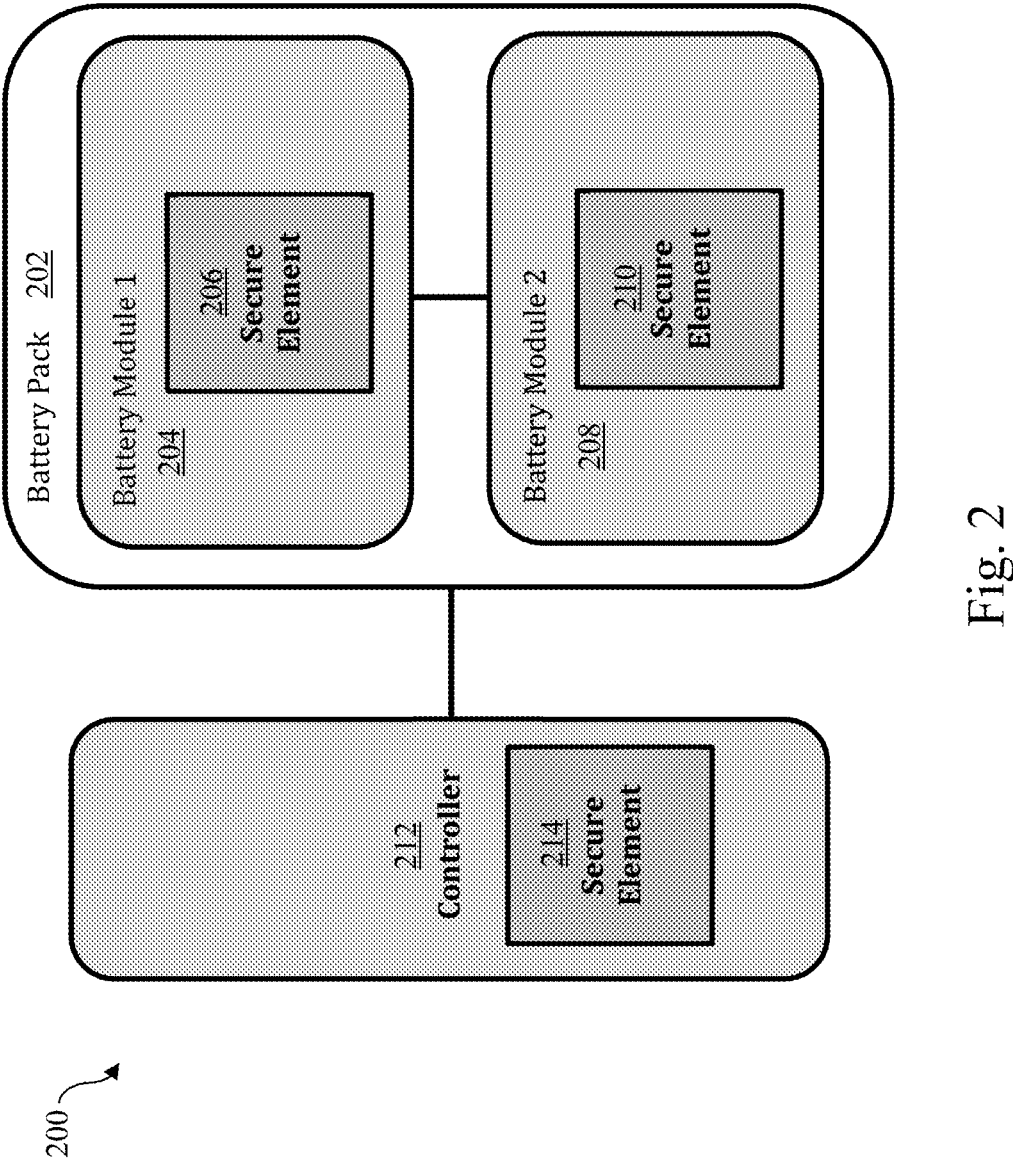
FIG. 2 shows an illustrative embodiment of a battery system.

FIG. 2 shows an illustrative embodiment of a battery system 200, in particular for use in a vehicle. The battery system 200 comprises a battery pack 202, which in turn comprises a plurality of battery modules 204, 208. Furthermore, the battery system 200 comprises a controller 212 operatively coupled to the battery modules 204, 208. In addition, the battery system 200 comprises a plurality of secure elements 206, 210, 214. In particular, each of the battery modules 204, 208 contains a secure element 204, 210 and the controller 212 contains a secure element 214. In accordance with the present disclosure, the secure elements 206, 210, 214 are configured to perform one or more authentication operations by executing a cryptographic algorithm. In this way, proving the authenticity and verifying the integrity of the battery modules 204, 208 within the battery pack 202 is facilitated. Furthermore, a flexible security concept may thereby be provided, which supports the use of multiple battery modules 204, 208, without compromising the performance of the battery system 200 in terms of latency. This, in turn, may prevent the unauthorized usage of battery modules 204, 208 in a battery pack 202 of the kind set forth. For instance, it can be detected whether the battery modules 204, 208 have been tampered with, or whether an attempt is made to insert counterfeit batteries into the battery system 200.

In one or more embodiments, the controller is an electronic control unit (ECU) comprised in the vehicle. An example of a suitable ECU is a body control module (BCM). Another example of a suitable ECU is a telematics control unit (TCU). In this way, the security concept may easily be implemented in the vehicle, in particular by using a component which is typically already available in said vehicle. For example, a BCM is typically already used for executing car access operations. Furthermore, a BCM typically already has a secure element for securing these operations; this secure element may then also be used for the purpose of authenticating the battery modules. However, the skilled person will appreciate that, where reference is made to a BCM in the embodiments described herein, another type of ECU may equally be used instead of said BCM. In one or more embodiments, the battery modules are placed in a series arrangement, wherein the first battery module in the series arrangement is configured to perform at least one authentication operation with the controller, and wherein each of the other battery modules in the series arrangement is configured to perform at least one authentication operation with a prior battery module in the series arrangement. In this way, an efficient authentication process may be realized, according to which the controller only needs to perform authentication with the first battery module, while still ensuring that all battery modules can be authenticated.

In one or more embodiments, the secure elements contained in the battery modules further contain data indicative of a charge state and/or a life state of said battery modules. In this way, the charge state and/or a life state can be stored safely, while it can still easily be retrieved by the controller. Furthermore, in one or more embodiments, the at least one secure element contained in the controller is configured to maintain a registry of the charge state or life state of the battery modules. In this way, the battery system can easily be managed by the controller.

In one or more embodiments, the cryptographic algorithm is an asymmetric cryptographic algorithm or a symmetric cryptographic algorithm. An asymmetric cryptographic algorithm is typically slower than a symmetric cryptographic algorithm, but may be more practical in certain applications. Furthermore, in one or more embodiments, the secure elements contained in the battery modules have been provisioned with cryptographic keys and/or cryptographic certificates in a trusted environment. In this way, the security level of the battery system may be further increased. Furthermore, in one or more embodiments, the at least one secure element contained in the controller has been provisioned with cryptographic keys and/or cryptographic certificates in a trusted environment and by an over-the-air (OTA) transmission. This results in a practical implementation. For example, the secure element of the controller may be pre-provisioned by a manufacturer of said secure element in the trusted environment, and post-provisioned by a vehicle manufacturer using a secured OTA transmission.

In a practical implementation, the battery system further comprises a battery management system (BMS) coupled between the controller and the plurality of battery modules, to facilitate the control of the battery modules. Furthermore, in a practical implementation, the authentication operations form part of a pairing process. Thus, pairing the controller to the battery modules includes authentication operations, to increase the level of security of the battery system.

FIG. 3 shows an illustrative embodiment of a method 300 of configuring a battery system. The method 300 comprises the following steps. At 302, the battery system is provided with a plurality of battery modules. At 304, the battery system is provided with a controller operatively coupled to the battery modules. Furthermore, at 306, the battery system is provided with a plurality of secure elements, wherein each of said battery modules contains at least one of said secure elements and wherein the controller contains at least one of said secure elements, and wherein said secure elements are configured to perform one or more authentication operations by executing a cryptographic algorithm. In this way, proving the authenticity and verifying the integrity of the battery modules is facilitated.

Figure 4:
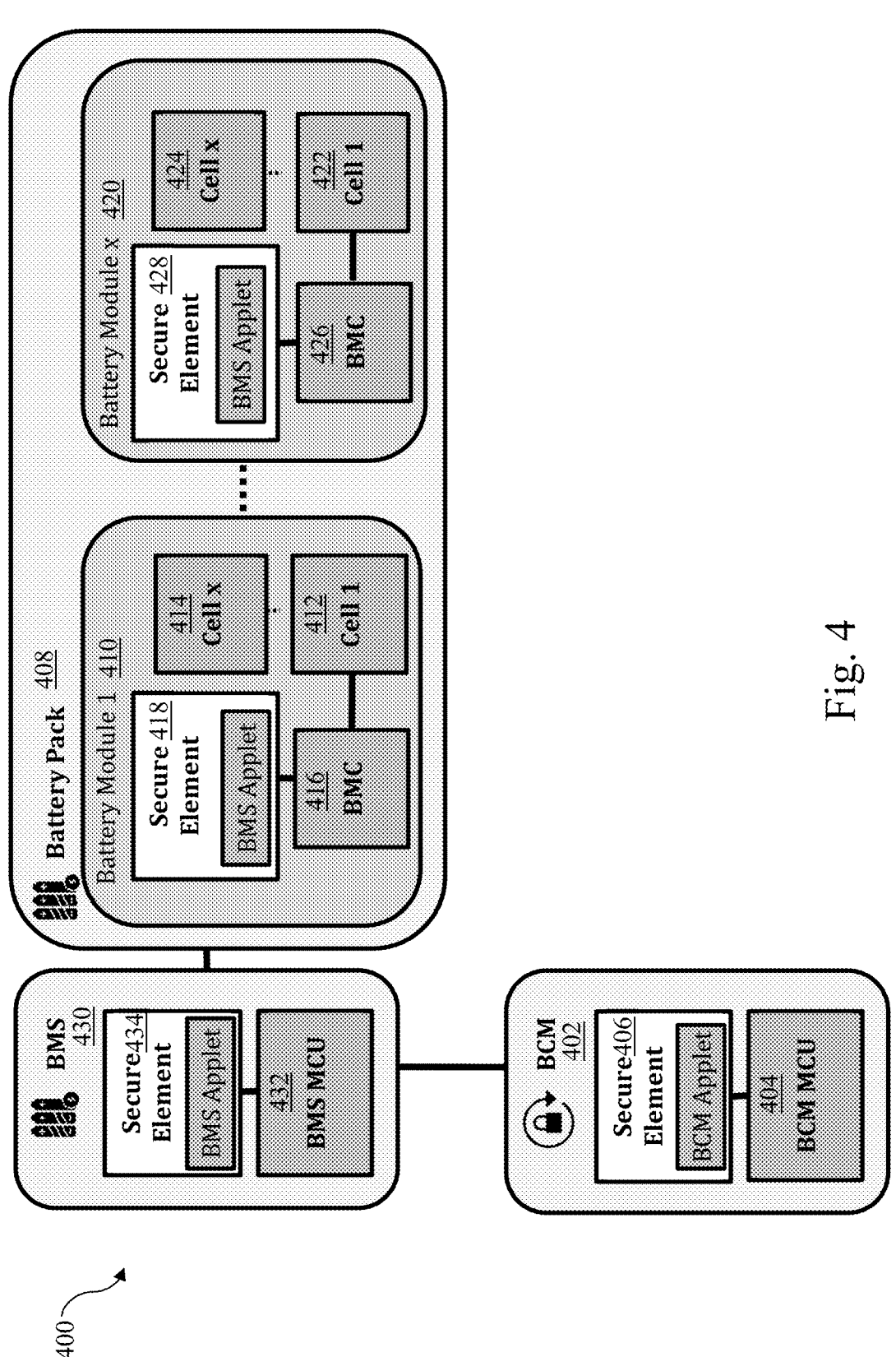
FIG. 4 shows an illustrative embodiment of a system for use in a vehicle.

FIG. 4 shows an illustrative embodiment of a system 400 for use in a vehicle. The system 400 comprises a battery pack 408 that includes a plurality of battery modules 410, 420. Each battery module 410, 420 contains a plurality of battery cells 412, 414, 422, 424 coupled to a battery module controller 416, 426. Furthermore, in accordance with the present disclosure, the battery modules 410, 420 contain a secure element 418, 428 operatively coupled to the battery module controller 416, 426. Furthermore, the system 400 comprises a body control module 402 coupled to the battery modules 410, 420 through a battery management system 430. Both the body control module 402 and the battery management system 430 contain a microcontroller 404, 432 and a secure element 406, 434. In particular, the battery management system 430 may be regarded as an example of a controller of the kind set forth, i.e. a controller containing a secure element 434 configured to perform authentication operations by executing a cryptographic algorithm. To this end, applets are provided in the secure elements 418, 428, 434. Furthermore, in this example, the BCM 402 contains a secure element 406 that is used to perform typical authentication operations with an external mobile device, such as a mobile phone or a key fob. Thus, the BCM 402 is used in typical car access applications. Furthermore, the secure elements 418, 428, 434 have been provisioned with cryptographic keys and/or cryptographic certificates, which may be used as input to the cryptographic algorithms coded in the applets. Although the system 400 provides a high level of security, it may be difficult to implement it. Furthermore, multiple host drivers may be needed to manage the plurality of secure elements 406, 418, 428, 434, and a latency may be introduced into the system 400.

Figure 5:
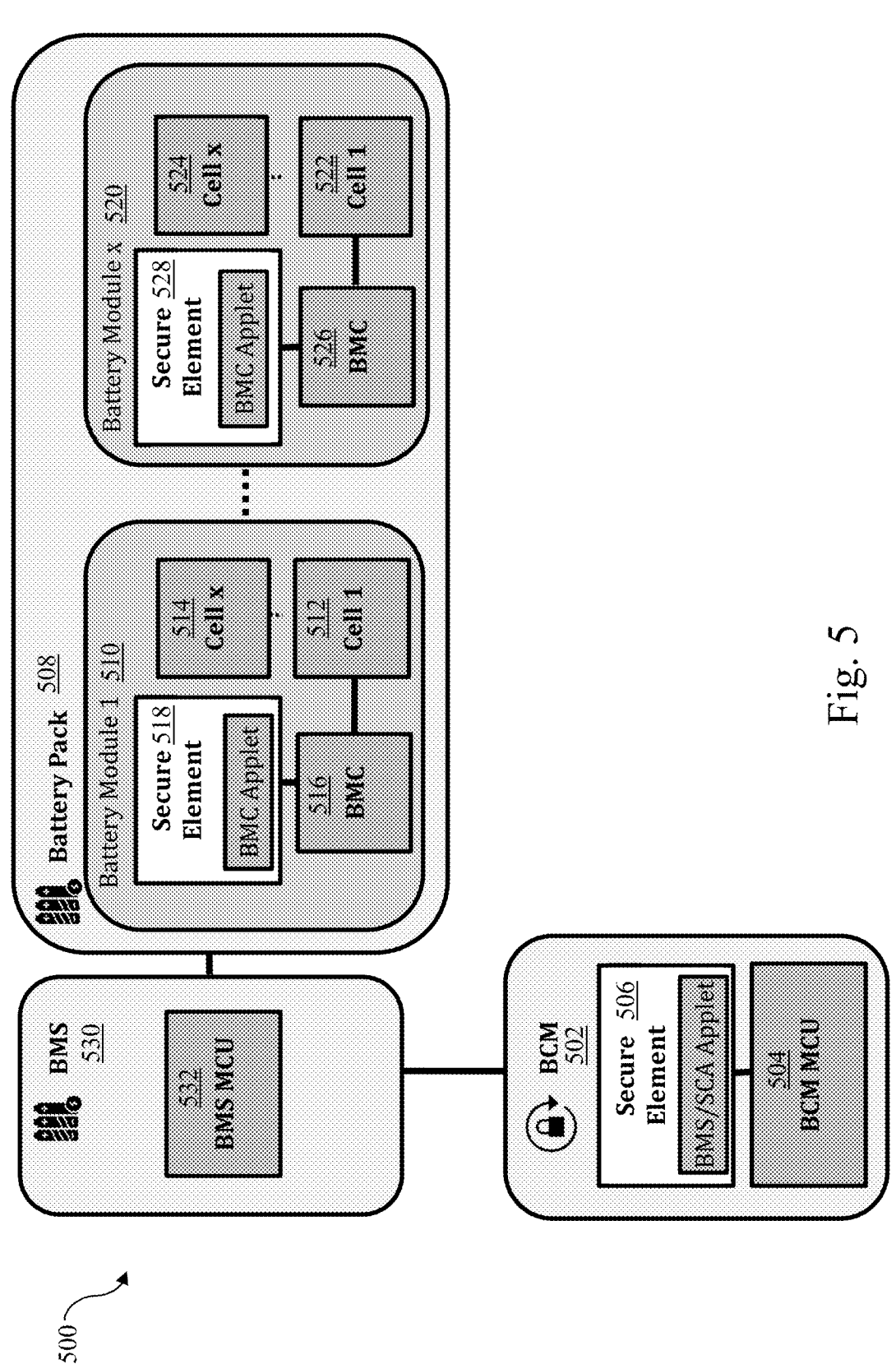
FIG. 5 shows another illustrative embodiment of a system for use in a vehicle.

FIG. 5 shows a further illustrative embodiment of a system 500 for use in a vehicle. The system 500 comprises a battery pack 408 that includes a plurality of battery modules 510, 520. Each battery module 510, 520 contains a plurality of battery cells 512, 514, 522, 524 coupled to a battery module controller 516, 526. Furthermore, in accordance with the present disclosure, the battery modules 510, 520 contain a secure element 518, 528 operatively coupled to the battery module controller 516, 526. Furthermore, the system 500 comprises a body control module 502 coupled to the battery modules 510, 520 through a battery management system 530. Both the body control module 502 and the battery management system 530 contain a microcontroller 504, 532. Furthermore, in accordance with the present disclosure, the body control module 502 contains a secure element 506. Thus, the body control module 402 may be regarded as an example of a controller of the kind set forth, i.e. a controller containing a secure element 506 configured to perform authentication operations by executing a cryptographic algorithm. To this end, applets are provided in the secure elements 506, 518, 528. Furthermore, the secure elements 506, 518, 528 have been provisioned with cryptographic keys and/or cryptographic certificates, which may be used as input to the cryptographic algorithms coded in the applets. Thus, in this example, the BCM 502 is not only used for car access applications, but also for the authentication of the battery modules 510, 520. Accordingly, the same authentication logic can be executed on a single secure element 506 within the BCM 502, by running two applets on the secure element 506.

It is noted that the system 500 is similar to the system shown in FIG. 4. However, the battery management system 530 does not contain a secure element, and the body control module 502 is configured to act as a controller of the kind set forth on its own. That is to say, the body control module 502 is configured to perform authentication operations with at least the first battery module 510 of the battery pack 510, wherein the battery management system 530 merely acts as a communication gateway. Furthermore, the secure elements 518, 520 contained in the battery modules 510, 520 may be configured to perform a first level of authentication. Compared to the system shown in FIG. 4, the system 500 may have a higher performance, while still providing a high level of security. For instance, no significant latency is introduced, because a first level of authentication may be performed by the battery modules 510, 520. Furthermore, the multitasking capability of the secure element 506 contained in the body control module 502 is used to advantage, in the sense that the applet executed by said secure element 506 not only implements a conventional secure car access (SCA) function, but also authentication operations with at with at least the first battery module 510 of the battery pack 510.

The presently disclosed battery system and corresponding configuration method may be exploited in various use cases. For example, during a battery pack preparation phase in an end-of-line scenario, the battery modules inserted into said battery pack may effectively be paired to each other. More specifically, if a battery pack consists to six battery modules, the second module may be paired by means of an authentication operation to the first module, the third module may be paired by means of an authentication operation to the second module, etc. This chain-like pairing may be performed up to and including the sixth module. Thus, a first authentication may be performed when a new battery pack is assembled. Then, when the battery pack is added to a vehicle, only the first module should authenticate with the BCM. In this way, the installation of the battery pack in the vehicle may be done more quickly. Furthermore, once the first battery module has been paired, it may share the confirmation with the other battery modules. In addition, the BCM may be made aware that six modules are available along with their state, which may include the charge state or life state (e.g., nearing end-of-life) of the modules.

In another example, when the engine of a vehicle is started, the BCM only needs to authenticate with the first battery module if the aforementioned chain-like pairing has been performed during installation. This authentication may use a symmetric algorithm, which is fast and does not add to the system latency. After starting the engine, the BCM may ask for a complete system check up from the first module. In this case, all the battery modules should be authenticated against each other, for instance using asymmetric algorithms, and/or against the BCM. In such a case, the battery life cycle information (i.e., the charge state or life state of the modules) may also be updated. It is noted that the life cycle information of the complete battery pack may be used for further actions, especially in case of a failure. Furthermore, during driving the life cycle information may continuously be updated in the secure element.

In a further example, when a battery module is replaced, the authentication may be performed as follows. If the first battery module is replaced, then the new module should be paired first with the BCM and then also with the second battery module. If the new module is a counterfeit, then the authentications will fail, and the attempt to insert the counterfeit module may be logged in the BCM. Furthermore, if the n-th battery module is replaced, then the new module should be paired with the (n−1)-th battery module and the (n+1)-th battery module. Once the replacement has been completed, the complete battery pack authentication may be performed and the life cycle information of the battery pack may be shared with the BCM.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 battery system
102 battery management system
104 battery management system microcontroller
106 battery pack
108 battery module 1
110 cell 1
112 cell x
114 battery module controller
116 battery module x
118 cell 1
120 cell x
122 battery module controller
200 battery system
202 battery pack
204 battery module 1
206 secure element
208 battery module 2
210 secure element
212 controller
214 secure element

8

300 method of configuring a battery system
302 providing a battery system with a plurality of battery modules
304 providing the battery system with a controller operatively coupled to the battery modules
306 providing the battery system with a plurality of secure elements, wherein each of said battery modules contains at least one of said secure elements and wherein the controller contains at least one of said secure elements, and wherein said secure elements are configured to perform one or more authentication operations by executing a cryptographic algorithm
400 system for use in a vehicle
402 body control module
404 body control module microcontroller
406 secure element
408 battery pack
410 battery module 1
412 cell 1
414 cell x
416 battery module controller
418 secure element
420 battery module x
422 cell 1
424 cell x
426 battery module controller
428 secure element
430 battery management system
432 battery management system microcontroller
434 secure element
500 system for use in a vehicle
502 body control module
504 body control module microcontroller
506 secure element
508 battery pack
510 battery module 1
512 cell 1
514 cell x
516 battery module controller
518 secure element
520 battery module x
522 cell 1
524 cell x
526 battery module controller
528 secure element
530 battery management system
532 battery management system microcontroller

What is claimed is:

1. A battery system for use in a vehicle, the battery system comprising:

a plurality of battery modules, each battery module including a battery module controller (BMC) and one or more batteries coupled to the BMC;

a controller including a battery management system (BMS) microcontroller unit (MCU) coupled to the plurality of battery modules; and a plurality of secure elements, each secure element including a memory device configured to store at least one of a cryptographic key and a cryptographic certificate;

wherein each of the plurality of battery modules includes at least one of the secure elements coupled to the BMC;

wherein the controller includes contains at least one of the plurality of said secure elements coupled to the BMS MCU; and wherein each of the BMS MCU and the BMC is configured to use a corresponding one of the plurality of secure elements to perform one or more authentication operations by executing a cryptographic algorithm to determine whether one or more battery modules of the plurality of battery modules has been tampered with or includes a counterfeit battery.

2. The battery system of claim 1, wherein the controller is an electronic control unit (ECU) comprised in the vehicle, in particular a body control module (BCM) or a telematics control unit (TCU).

3. The battery system of claim 1, wherein the battery modules are placed in a series arrangement, wherein the first battery module in the series arrangement is configured to perform at least one authentication operation with the controller, and wherein each of the other battery modules in the series arrangement is configured to perform at least one authentication operation with a prior battery module in the series arrangement.

4. The battery system of claim 1, wherein the secure elements contained in the battery modules further contain data indicative of a charge state and/or a life state of said battery modules.

5. The battery system of claim 4, wherein the at least one secure element contained in the controller is configured to maintain a registry of the charge state and/or life state of the battery modules.

6. The battery system of claim 1, wherein the cryptographic algorithm is an asymmetric cryptographic algorithm or a symmetric cryptographic algorithm.

7. The battery system of claim 1, wherein the secure elements contained in the battery modules have been provisioned with cryptographic keys and/or cryptographic certificates in a trusted environment.

8. The battery system of claim 1, wherein the at least one secure element contained in the controller has been provisioned with cryptographic keys and/or cryptographic certificates in a trusted environment and by an over-the-air transmission.

9. The battery system of claim 1, further comprising a battery management system, BMS, coupled between the controller and the plurality of battery modules.

10. The battery system of claim 1, wherein the authentication operations form part of a pairing process.

11. A method of configuring a battery system for use in a vehicle, comprising:

providing the battery system with a plurality of battery modules, each battery module including a battery module controller (BMC) and one or more batteries coupled to the BMC;

providing the battery system with a controller including a battery management system (BMS) microcontroller unit (MCU) coupled to the plurality of battery modules;

providing the battery system with a plurality of secure elements, each secure element including a memory device configured to store at least one of a cryptographic key and a cryptographic certificate, wherein each of the plurality of battery modules includes at least one of the plurality of secure elements coupled to the BMC, wherein the controller includes at least one of the plurality of secure elements coupled to the BMS MCU, and wherein each of the BMS MCU and the BMC is configured to use a corresponding one of the plurality of secure elements to perform one or more authentication operations by executing a cryptographic algorithm; and determining that one or more battery modules of the plurality of battery modules has been tampered with or includes a counterfeit battery by performing the one or more authentication operations.

12. The method of claim 11, wherein the controller is an electronic control unit (ECU) comprised in the vehicle, in particular a body control module (BCM) or a telematics control unit (TCU).

13. The method of claim 11, wherein the battery modules are placed in a series arrangement, wherein the first battery module in the series arrangement is configured to perform at least one authentication operation with the controller, and wherein each of the other battery modules in the series arrangement is configured to perform at least one authentication operation with a prior battery module in the series arrangement.

14. The method of claim 11, wherein the secure elements contained in the battery modules further contain data indicative of a charge state and/or a life state of said battery modules.

15. The method of claim 14, wherein the at least one secure element contained in the controller is configured to maintain a registry of the charge state and/or life state of the battery modules.

16. The method of claim 11, wherein the cryptographic algorithm is an asymmetric cryptographic algorithm or a symmetric cryptographic algorithm.

17. The method of claim 11, wherein the secure elements contained in the battery modules have been provisioned with cryptographic keys and/or cryptographic certificates in a trusted environment.

18. The method of claim 11, wherein the at least one secure element contained in the controller has been provisioned with cryptographic keys and/or cryptographic certificates in a trusted environment and by an over-the-air transmission.

19. The method of claim 11, wherein the battery system further comprises a battery management system (BMS) coupled between the controller and the plurality of battery modules.

20. The method of claim 11, wherein the authentication operations form part of a pairing process.

* * * * *